(12) United States Patent
Kim

(10) Patent No.: US 10,638,811 B2
(45) Date of Patent: May 5, 2020

(54) METHOD FOR MANUFACTURING SHOES

(71) Applicant: Hyeokju Kim, Busan (KR)

(72) Inventor: Hyeokju Kim, Busan (KR)

( * ) Notice: Subject to any disclaimer, the term of this patent is extended or adjusted under 35 U.S.C. 154(b) by 383 days.

(21) Appl. No.: 15/541,016

(22) PCT Filed: May 23, 2016

(86) PCT No.: PCT/KR2016/005432
§ 371 (c)(1),
(2) Date: Jun. 29, 2017

(87) PCT Pub. No.: WO2017/191864
PCT Pub. Date: Nov. 9, 2017

(65) Prior Publication Data
US 2018/0199664 A1     Jul. 19, 2018

(30) Foreign Application Priority Data

May 4, 2016 (KR) .................. 10-2016-0055439

(51) Int. Cl.
    *A43B 13/12*     (2006.01)
    *A43B 9/12*     (2006.01)
    (Continued)

(52) U.S. Cl.
    CPC .............. *A43B 13/12* (2013.01); *A43B 9/12* (2013.01); *A43B 13/04* (2013.01); *A43B 13/125* (2013.01);
    (Continued)

(58) Field of Classification Search
    CPC ...... C09J 5/02; C09J 175/04; C09J 2427/003; C09J 2433/003; C09J 2475/003;
    (Continued)

(56) References Cited

U.S. PATENT DOCUMENTS 8,440,308 B2 * 5/2013 Harano ................. A43B 9/12
                                                                  156/275.7
2013/0318835 A1   12/2013   Mutsuda et al.

FOREIGN PATENT DOCUMENTS

JP        2000041701 A     2/2000
KR       200257387 Y1    12/2001
                  (Continued)

OTHER PUBLICATIONS

Derwent abstract for WO-2014100865, Jul. 2014.*
(Continued)

*Primary Examiner* — Philip C Tucker
*Assistant Examiner* — Jimmy R Smith, Jr.
(74) *Attorney, Agent, or Firm* — Renaissance IP Law Group LLP

(57) ABSTRACT

The present invention relates to a method for manufacturing shoes that includes: (a) preparing a midsole material and performing a multi-functional treatment by irradiation of a defined amount of UV energy to provide adhesive-friendly properties; (b) molding the midsole material from the UV irradiation step to form a midsole having a defined shape; (c) preparing a multi-functional adhesive primer used to provide stable adhesive strength for the molded midsole and secure surface modification and adequate applicability of the midsole material; (d) applying the multi-functional adhesive primer to the molded midsole; (e) irradiating UV radiation to the midsole coated with the multi-functional adhesive primer to perform a curing; and (f) bonding an outsole, an upper, and other shoe parts to the midsole from the step (e) to complete a shoe.
Unlike the conventional method for manufacturing shoes, the present invention enables to skip the steps of washing and using an additional primer for midsole to reduce the process, enhance the adhesion and increase productivity.

5 Claims, 1 Drawing Sheet

(51) Int. Cl.

| | |
|---|---|
| *A43B 13/04* | (2006.01) |
| *B32B 7/12* | (2006.01) |
| *C09J 5/06* | (2006.01) |
| *C09J 175/04* | (2006.01) |
| *B29D 35/14* | (2010.01) |
| *A43B 13/18* | (2006.01) |
| *A43D 25/20* | (2006.01) |
| *B29D 35/12* | (2010.01) |
| *B32B 27/30* | (2006.01) |
| *B32B 27/32* | (2006.01) |
| *B32B 37/12* | (2006.01) |
| *B32B 37/18* | (2006.01) |
| *B29K 23/00* | (2006.01) |
| *B29K 96/00* | (2006.01) |

(52) U.S. Cl.
CPC ............ *A43B 13/187* (2013.01); *A43D 25/20* (2013.01); *B29D 35/122* (2013.01); *B29D 35/142* (2013.01); *B32B 7/12* (2013.01); *B32B 27/306* (2013.01); *B32B 27/32* (2013.01); *B32B 37/12* (2013.01); *B32B 37/182* (2013.01); *C09J 5/06* (2013.01); *C09J 175/04* (2013.01); *B29K 2023/083* (2013.01); *B29K 2096/00* (2013.01); *B32B 2037/1269* (2013.01); *B32B 2255/10* (2013.01); *B32B 2255/26* (2013.01); *B32B 2310/0831* (2013.01); *B32B 2323/04* (2013.01); *B32B 2333/00* (2013.01); *B32B 2355/00* (2013.01); *B32B 2437/02* (2013.01); *C09J 2205/31* (2013.01); *C09J 2427/00* (2013.01); *C09J 2433/00* (2013.01); *C09J 2475/00* (2013.01)

(58) Field of Classification Search
CPC .... C09J 2205/31; A43B 13/12; A43B 13/125; A43B 13/187; A43B 9/12; B29D 35/122; B29D 35/142; B32B 2437/02; B32B 7/12
See application file for complete search history.

(56) References Cited

FOREIGN PATENT DOCUMENTS

| | | | | |
|---|---|---|---|---|
| KR | 100662726 B1 | 12/2006 | | |
| KR | 101180609 B1 | 9/2012 | | |
| KR | 101726428 B1 | 4/2017 | | |
| WO | WO-2014100865 A1 * | 7/2014 | ................ | C09J 5/02 |
| WO | WO-2017156674 A1 * | 9/2017 | ............ | C08F 279/02 |

OTHER PUBLICATIONS

Google machine translation for WO-2014100865, Jul. 2014.*
International Search Report for PCT/KR2016/005432, dated Jan. 18, 2017.

* cited by examiner

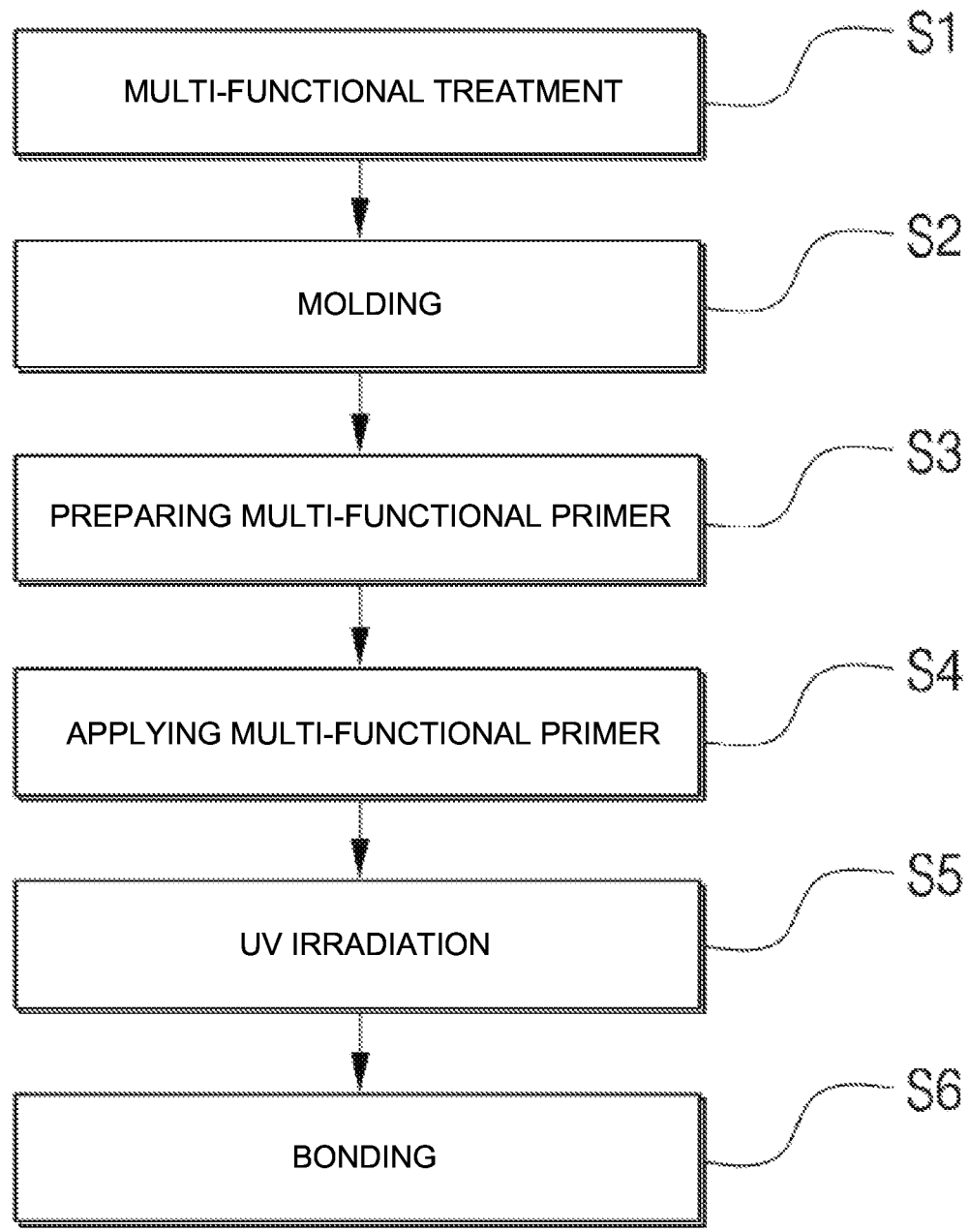

METHOD FOR MANUFACTURING SHOES

BACKGROUND OF THE INVENTION

The present invention relates to a method for manufacturing shoes, and more particularly to a method for manufacturing shoes that adopts a new method of using a multi-functional treatment process and a multi-functional adhesive primer to simplify the existing midsole treatment process and secure stable adhesive strength and makes the manufacturing process simple to reduce the production cost and enhance the productivity.

In general, ethylene vinyl acetate (EVA) and master batch (pellet type raw material) are the main components of the midsole for shoe. The high-performance special midsole is manufactured from the foaming and molding process using the mold of a raw material consisting of alpha-olefin copolymer (Tafmer), olefin block copolymer (OBC), etc. as its principal ingredients.

As such, the existing popular method for manufacturing a midsole for shoe uses a foaming and molding process for the above raw material and involves performing a molding step using a mold, performing a mechanical wash, applying a liquid-state midsole primer, exposing to UV radiations, and then bonding to other materials to complete shoes.

More specifically, the manufacture of a general midsole includes molding, performing wash and drying or surface roughing, applying a liquid-state midsole primer, drying, and then exposing to UV radiations.

For the high-performance midsole that is hard of having good adhesion, the manufacturing method includes molding, surface roughing, manual toluene-wash and drying, dipping in methylethyl ketone (MEK) and drying, dipping in a solvent type UV primer and drying, exposure to UV radiation, and dipping in a solvent type PU agent and drying.

Subsequently, the midsole thus prepared is subjected to applying an adhesive and drying and then bonding to other shoe parts to complete a shoe.

In other words, the conventional method performs many additional steps for the molded midsole to secure stable adhesive strength with other parts, as described above. An at least six-step treatment process is required to complete a general midsole, and an at least ten-step treatment process is performed to make a high-performance midsole.

With so many treatment steps, the conventional method for manufacturing shoes takes too much time, has the difficulty of reducing the production cost, and encounters deterioration in productivity.

PRIOR TECHNICAL DOCUMENTS

Patent Documents

Patent Document 1: KR Patent Publication No. 10-2014-0073744

BRIEF SUMMARY OF THE INVENTION

For solving the above-mentioned problems with the prior art, it is an object of the present invention to provide a method for manufacturing shoes that adopts a new method of using a multi-functional treatment process and a multi-functional adhesive primer to simplify the existing midsole treatment process and secure stable adhesive strength and makes the manufacturing process simple to reduce the production cost and enhance the productivity.

It is another object of the present invention to provide a coating waterproof material and its construction method, which coating waterproof material has high impact strength and good physical properties and is applied by spraying and effective in preventing the problem with the coating waterproof material, pin holes.

It is still another object of the present invention to provide a method for manufacturing shoes that reduces the manufacturing process by skipping the washing step and performs the manufacturing process in an eco-friendly way.

To achieve the objects of the present invention, there is provided a method for manufacturing shoes that includes: (a) preparing a midsole material and performing a multi-functional treatment by irradiation of a defined amount of UV energy to provide adhesive-friendly properties; (b) molding the midsole material from the UV irradiation step to form a midsole having a defined shape; (c) preparing a multi-functional adhesive primer used to provide stable adhesive strength for the molded midsole and secure surface modification and adequate applicability of the midsole material; (d) applying the multi-functional adhesive primer to the molded midsole; (e) irradiating UV radiation to the midsole coated with the multi-functional adhesive primer to perform a curing; and (f) bonding an outsole, an upper, and other shoe parts to the midsole from the step (e) to complete a shoe. The step (c) of preparing a multi-functional adhesive primer includes: a first step of mixing phosphoric acid and DL-malic acid with methyl ethyl ketone (MEK) until complete dissolution of the acid components and then adding ethyl acetate (EA), methylcyclohexane (MCH) and propylene glycol monomethyl ether acetate (PGMEA) under agitation to prepare a mixture; a second step of adding chlorinated polymer and polyvinyl chloride to the mixture of the first step and then adding 2-hydroxyethyl methacrylate (2-HEMA), methacrylate, and butanediol dimethacrylate (BDDMA); and a third step of adding polyurethane and then benzophenone and 1-hydroxycyclohexyl phenyl ketone used as photoinitiators to the mixture from the second step.

The step (c) includes mixing, with respect to 100 parts by weight of ethyl acetate (EA), 30 to 40 parts by weight of methyl ethyl ketone (MEK), 30 to 40 parts by weight of methyl cyclohexane (MCH), 5 to 10 parts by weight of propylene glycol monomethyl ether acetate (PGMEA), 0.2 to 0.4 part by weight of phosphoric acid, 0.2 to 0.4 part by weight of malic acid, 0.4 to 0.5 part by weight of chlorinated polymer, 0.4 to 0.5 part by weight of polyvinyl chloride, 0.5 to 0.8 part by weight of 2-hydroxyethyl methacrylate (2-HEMA), 0.5 to 0.8 part by weight of methacrylate, 0.8 to 1.0 part by weight of butanediol dimethacrylate (BDDMA), 2 to 3 parts by weight of polyurethane (PU), 0.05 to 0.10 part by weight of benzophenone, and 0.05 to 0.10 part by weight of 1-hydroxycyclohexyl phenyl ketone to prepare a multi-functional adhesive primer.

The step (a) includes irradiating 2.0±0.2 $J/cm^2$ of UV energy to the midsole material to perform a multi-functional treatment, and the step (e) includes irradiating 1.5 to 2.0 $J/cm^2$ of UV energy to the midsole coated with the multi-functional adhesive primer.

The step (f) includes: applying a two-component rubber primer to the outsole and then performing a hot drying; applying an adhesive to the outsole coated with the rubber primer and dried and then performing a drying at 55 to 65° C. for 2 to 3 minutes; and bonding the outsole to the midsole coated with the multi-functional adhesive primer.

The step (d) includes applying the multi-functional adhesive primer to the midsole and then performing a drying at 50±10° C. for 2 to 4 minutes.

Effects of Invention

Unlike the conventional method for manufacturing shoes, the present invention enables to skip the steps of washing and using an additional primer for midsole to reduce the process, enhance the adhesion and increase productivity.

The present invention adopts a new method of using a multi-functional treatment process and a multi-functional adhesive primer to simplify the existing midsole treatment process and secure stable adhesive strength.

The present invention reduces the process to decrease labor and facility and contribute to the cost reduction and skips the washing step to perform the manufacturing process in an eco-friendly way.

BRIEF DESCRIPTION OF THE SEVERAL VIEW OF THE DRAWING

FIG. 1 is a schematic process chart explaining a method for manufacturing shoes according to an embodiment of the present invention.

DETAILED DESCRIPTION OF THE INVENTION

Hereinafter, the preferred embodiments of the present invention will be described in detail with reference to the accompanying drawing. The above and other objects and features of the invention will become apparent from the following description of embodiments of the present invention.

As shown in FIG. 1, the method for manufacturing shoes according to an embodiment of the present invention comprises a multi-functional treatment step S1, a molding step S2, a step S3 of preparing a multi-functional adhesive primer, a step S4 of applying the multi-functional adhesive primer, an UV irradiation step S5, and a bonding step S6.

The multi-functional treatment step S1 is a pretreatment step performed prior to the molding process of a midsole material and involves a multi-functional treatment by irradiating energy to the midsole material.

For this process, the midsole material is passed through equipment that irradiates energy of 2.0 J/cm$^2$ or above to achieve multi-functional treatment, including transforming the midsole material to have properties useful for adhesion by irradiating a defined amount of energy.

In this regard, the midsole material is a general midsole material or a high-performance midsole material. Examples of the general midsole material may include, but are not limited to, ethylene vinyl acetate (EVA), master batch (pellet type raw material), etc. Examples of the high-performance midsole material may include, but are not limited to, alpha-olefin copolymer (Tafmer) or olefin block copolymer (OBC), etc.

Preferably, the used amount of the energy is 2.0±0.2 J/cm$^2$. Examples of the energy as used herein may include UV radiation, laser, ultrasound, infrared radiation, etc.

The midsole material is chiefly made of an olefin-based polymer as described above. The olefin-based polymer is a polymer having a hard structure, of which the hardness becomes weak upon an exposure to a defined amount of energy such as UV radiation, making the soft structure contribute to having stable adhesive strength. Particularly, an exposure to the energy changes the structure of the midsole material to have an adhesive-friendly structure.

An extremely low amount of the energy exposure results in the difficulty of changing the midsole material into an adhesive-friendly structure, and an excess of the energy exposure causes a burn or shrinkage of the midsole material.

The molding step S2 is using a mold for molding the midsole material after an exposure to energy for multi-functional treatment to form a midsole in a defined shape.

The step S3 of preparing a multi-functional adhesive primer is preparing a multi-functional adhesive primer in order to provide stable adhesive strength for the molded midsole and secure surface modification and adequate applicability of the midsole material.

In this regard, the multi-functional adhesive primer is prepared by mixing methyl ethyl ketone (MEK), ethyl acetate (EA), methyl cyclohexane (MCH), and propylene glycol monomethyl ether acetate (PGMEA) together.

To the resultant mixture are added phosphoric acid, DL-malic acid, chlorinated polymer, and polyvinyl chloride.

The chlorinated polymer as used herein may be Pergut® S 20 commercially available from Bayer MaterialScience Inc.

To the chlorinated polymer are added 2-hydroxyethyl methacrylate (2-HEMA), methacrylate [메타크릴산화합물], and butanediol dimethylacrylate (BDDMA).

Preferably, the methacrylate compound is a mixture of n-lauryl methacrylate and tridecyl methacrylate and may be Light Ester L-7 commercially available from KYOEISHA CHEMICAL Inc.

Other additives are polyurethane (PU) and then benzophenone and 1-hydroxycyclohexyl phenyl ketone used as photoinitiators.

The 1-hydroxycyclohexyl phenyl ketone as used herein may be Igacure 184D commercially available from Ciba Specialty Chemicals.

More specifically, the multi-functional adhesive primer preferably comprises, with respect to 100 parts by weight of ethylacetate (EA), 30 to 40 parts by weight of methyl ethyl ketone (MEK), 30 to 40 parts by weight of methyl cyclohexane (MCH), 5 to 10 parts by weight of propylene glycol monomethyl ether acetate (PGMEA), 0.2 to 0.4 part by weight of phosphoric acid, 0.2 to 0.4 part by weight of malic acid, 0.4 to 0.5 part by weight of chlorinated polymer, 0.4 to 0.5 part by weight of polyvinyl chloride, 0.5 to 0.8 part by weight of 2-hydroxyethyl methacrylate (2-HEMA), 0.5 to 0.8 part by weight of methacrylate, 0.8 to 1.0 part by weight of butanediol dimethacrylate (BDDMA), 2 to 3 parts by weight of polyurethane (PU), 0.05 to 0.10 part by weight of benzophenone, and 0.05 to 0.10 part by weight of 1-hydroxycyclohexyl phenyl ketone.

The preparation method for the multi-functional adhesive primer can be explained as follows.

Phosphoric acid and DL-malic acid are added to methyl ethyl ketone (MEK). After agitation of the resultant mixture until the acid components are completely dissolved, ethylacetate (EA), methylcyclohexane (MCH) and propylene glycol monomethyl ether acetate (PGMEA) are added under agitation to prepare a mixture.

To the resultant mixture are added chlorinated polymer and polyvinyl chloride, and then 2-hydroxyethyl methacrylate (2-HEMA), methacrylate, and butanediol dimethacrylate (BDDMA).

Polyurethane is added to the mixture, and then benzophenone and 1-hydroxycyclohexyl phenyl ketone are added and mixed until the ingredients are completely dissolved.

The step S4 of applying a multi-functional adhesive primer is the step of applying the above-prepared multi-functional primer to the midsole.

After the application of the multi-functional primer to the midsole, the midsole is preferably dried at 50±10° C. for 2 to 4 minutes.

The UV irradiation step S5 is the step of irradiating UV radiation to the midsole coated with the multi-functional adhesive primer to cure the multi-functional adhesive primer.

Preferably, the UV radiation is 1.5 to 2.0 J/cm$^2$ of energy.

The bonding step S6 is the step of bonding an outsole, an upper and other shoe parts to the midsole after the completion of the UV irradiation to complete a shoe.

A two-component rubber primer (e.g., AQUACE PR-505, commercially available from Henkel) is applied to the bonding surface of the outsole.

In this regard, the two-component rubber primer is the mixture of a powdered solute and a solvent. Preferably, the two-component rubber primer is used when the solute is completely dissolved in the solvent. Preferably, a heat drying is performed after the application of the rubber primer.

Then, an adhesive (e.g., AQUQCE W-01, commercially available from Henkel) is applied to the outsole coated with the rubber primer and dried, which outsole is then dried at 55 to 65° C. for 2 to 3 minutes. The outsole coated with the adhesive is attached to the midsole with the multi-functional primer and then bonded using a compressor to complete a shoe.

In the manufacturing process, the multi-functional treatment step S1, the molding step S2 and the step S3 of preparing a multi-functional adhesive primer may be performed in different orders.

The following comparative example was implemented as a conventional method for manufacturing shoes for a comparison with the novel method for manufacturing shoes using a multi-functional treatment process and a multi-function primer.

Comparative Example

An adequate amount of the midsole material was poured into a mold, and a foaming and molding process was carried out to complete a midsole. The midsole was passed through a washing machine using three different washing solvents and then subjected to hot drying.

Subsequently, a UV primer (e.g., AQUACE PR-607, commercially available from Henkel) was applied to the bonding surface of the midsole completely dried out by hot drying. The midsole was then exposed to the UV radiation to perform a hot drying.

An adhesive (e.g., AQUQCE W-01, commercially available from Henkel) was applied to the midsole. The midsole with the adhesive was dried at 45 to 55° C. for 5 minutes, attached to the outsole, and then bonded completely using a compressor to complete a shoe.

Subsequently, the following experimental example was performed.

Experimental Example

The specimens obtained from the manufacturing method of the present invention and the comparative example were evaluated in regards to the adhesive strength between midsole and outsole For this purpose, the present invention and the comparative example were measured in regards to the adhesive strength according to the peeling test using a tensile strength tester (INSTRON 4443) in 24 hours after the bonding of the midsole and the outsole. The test was performed twice in total. The measurement results are presented in Table 1.

TABLE 1

| Div. | | Present invention | Comparative example |
| --- | --- | --- | --- |
| Peeling test (kgf/cm) | Adhesive strength between midsole and outsole (first test) | 4.0 to 5.0 (midsole broken) | 3.5 to 4.5 |
| | Adhesive strength between midsole and outsole (second test) | 4.5 to 5.5 (midsole broken) | 3.5 to 4.5 |

As can be seen from Table 1, the specimen prepared from the multi-functional treatment process and the multi-function adhesive primer of the present invention was superior in terms of the adhesive strength to the specimen (comparative example) obtained from the conventional manufacturing method.

Although the exemplary embodiments of the present invention have been described, it is understood that the present invention should not be limited to these exemplary embodiments and accompanying drawings but various alternatives, changes and modifications can be made by one ordinary skilled in the art within the spirit and scope of the present invention as hereinafter claimed.

What is claimed is:

1. A method for manufacturing shoes, comprising:
   (a) preparing a midsole material and performing a multi-functional treatment by irradiation on the midsole material of a defined amount of UV energy to soften the structure of the midsole material;
   (b) molding the midsole material from the UV irradiation step to form a midsole having a defined shape;
   (c) preparing a multi-functional adhesive primer used to provide stable adhesive strength for the molded midsole by surface modification of the midsole material;
   (d) applying the multi-functional adhesive primer to the molded midsole;
   (e) irradiating UV radiation to the midsole with the applied multi-functional adhesive primer to perform a curing; and
   (f) bonding an outsole, an upper, and other shoe parts to the midsole from the step (e) to complete a shoe,
   wherein the step (c) of preparing a multi-functional adhesive primer comprises:
   a first step of mixing phosphoric acid and DL-malic acid with methyl ethyl ketone (MEK) until complete dissolution of the acid components and then adding ethyl acetate (EA), methylcyclohexane (MCH) and propylene glycol monomethyl ether acetate (PGMEA) under agitation to prepare a mixture;
   a second step of adding chlorinated polymer and polyvinyl chloride to the mixture of the first step and then adding 2-hydroxyethyl methacrylate (2-HEMA), methacrylate, and butanediol dimethacrylate (BDDMA); and
   a third step of adding polyurethane and then benzophenone and 1-hydroxycyclohexyl phenyl ketone used as photoinitiators to the mixture from the second step.

2. The method for manufacturing shoes as claimed in claim 1, wherein the step (c) comprises mixing, with respect to 100 parts by weight of ethyl acetate (EA), 30 to 40 parts by weight of methyl ethyl ketone (MEK), 30 to 40 parts by weight of methyl cyclohexane (MCH), 5 to 10 parts by weight of propylene glycol monomethyl ether acetate (PG-MEA), 0.2 to 0.4 part by weight of phosphoric acid, 0.2 to 0.4 part by weight of malic acid, 0.4 to 0.5 part by weight of chlorinated polymer, 0.4 to 0.5 part by weight of polyvinyl chloride, 0.5 to 0.8 part by weight of 2-hydroxyethyl methacrylate (2-HEMA), 0.5 to 0.8 part by weight of methacrylate, 0.8 to 1.0 part by weight of butanediol dimethacrylate (BDDMA), 2 to 3 parts by weight of polyurethane (PU), 0.05 to 0.10 part by weight of benzophenone, and 0.05 to 0.10 part by weight of 1-hydroxycyclohexyl phenyl ketone to prepare the multi-functional adhesive primer.

3. The method for manufacturing shoes as claimed in claim 1, wherein the step (a) comprises irradiating 2.0±0.2 J/cm2 of UV energy to the midsole material to perform the multi-functional treatment, wherein the step (e) comprises irradiating 1.5 to 2.0 J/cm2 of UV energy to the midsole with the applied multi-functional adhesive primer.

4. The method for manufacturing shoes as claimed in claim 1, wherein the step (f) comprises:
  applying a two-component rubber primer to the outsole and then performing a hot drying;
  applying an adhesive to the outsole with the applied two-component rubber primer, drying the adhesive, and then drying the outsole at 55 to 65° C. for 2 to 3 minutes; and
  bonding the outsole to the midsole with the applied multi-functional adhesive primer.

5. The method for manufacturing shoes as claimed in claim 1, wherein the step (d) comprises applying the multi-functional adhesive primer to the midsole and then performing a drying at 50±10° C. for 2 to 4 minutes.

* * * * *